(12) United States Patent
Yu

(10) Patent No.: US 6,349,254 B1
(45) Date of Patent: Feb. 19, 2002

(54) SHIFT CONTROL METHOD FOR AUTOMATIC TRANSMISSION

(75) Inventor: Pyung-Hwan Yu, Suwon (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/584,147

(22) Filed: May 31, 2000

(30) Foreign Application Priority Data

Nov. 16, 1999 (KR) ............................................ 99-50787

(51) Int. Cl.$^7$ ........................ G06F 17/00; G06F 19/00
(52) U.S. Cl. ........................ 701/54; 701/51; 701/55; 701/85; 475/128; 477/156; 477/161; 477/174
(58) Field of Search ........................ 701/51, 52, 54, 701/55, 85; 477/144, 155, 156, 161, 166, 173, 174; 475/127, 128, 216, 296

(56) References Cited

U.S. PATENT DOCUMENTS 5,443,594 A * 8/1995 Takada et al. ................ 477/98
6,016,456 A * 1/2000 Yu ................................ 701/55
6,073,610 A * 6/2000 Matsumoto et al. ........ 123/396

\* cited by examiner

*Primary Examiner*—Gertrude Arthur

(57) ABSTRACT

A shift control method for an automatic transmission which includes converting to a lean-burn mode from a normal mode if throttle voltage is less than a first predetermined value; determining if tip-in has occurred in the lean-burn mode using accelerator pedal signals; increasing the throttle valve opening if it is determined that the throttle voltage has increased by a second predetermined value such that engine rpm is increased; determining if the difference between engine rpm and turbine rpm is greater than a predetermined number of rpm; and converting from the lean-burn mode to the normal mode if the engine rpm are greater than the turbine rpm by the predetermined number of rpm.

4 Claims, 3 Drawing Sheets

SHIFT CONTROL METHOD FOR AUTOMATIC TRANSMISSION

BACKGROUND OF THE INVENTION (a) Field of the Invention

The present invention relates to a shift control method for a vehicle equipped with an electronic throttle control (ETC) system and a gasoline direct injection (GDI) system which prevents the occurrence of shock generated during tip-in.

(b) Description of the Related Art

Shock is generated during tip-in using a conventional transmission. In FIG. 1, line 1 is a waveform of an output of a throttle valve position sensor for a vehicle that is not equipped with an ETC system. In such a vehicle, the throttle is indexed with an accelerator pedal. Line 2 in the drawing is a waveform of an output of a throttle valve position sensor for a vehicle having an ETC system. Nt in the drawing represents turbine rpm, Ne is engine rpm, and T is torque. As shown by line 2, in a vehicle having an ETC system, the throttle valve opening varies linearly in response to the abrupt operation of the accelerator pedal. That is, when the accelerator pedal is abruptly depressed, the throttle valve opening increases at a uniform rate.

Region A in FIG. 1 indicates a state in which the accelerator pedal has been released such that the vehicle operates in a lean-burn mode. At this time, in a vehicle not equipped with an ETC system, if the driver again depresses the accelerator pedal, the throttle valve position sensor generates a throttle valve opening voltage as shown in line 1 according to the abrupt increase in throttle valve opening. That is, in a vehicle not having an ETC system, the throttle valve is indexed with the accelerator pedal. On the other hand, in a vehicle having an ETC system, in order to prevent the abrupt increase in torque as a result of the abrupt increase in throttle valve opening, the ETC system delays the response in the throttle valve opening such that the resulting throttle valve opening voltage is increased at a predetermined rate as shown in line 2.

In the conventional vehicle, the vehicles runs in a lean-burn mode when the accelerator pedal is not being depressed (region A), and runs in a normal mode when the accelerator is depressed (region B). The transition to the normal mode from the lean-burn mode occurs when the output of the ETC exceeds, for example, 0.7V, that is when the output of the ETC increases 0.2V from the 0.5V output of the lean-burn mode. However, when converting to the normal mode form the lean-burn mode, engine rpm Ne abruptly increases to a level greater than the turbine rpm Nt. Accordingly, the torque T undergoes a backlash as shown by region C in FIG. 1, thereby resulting in the generation of shock.

SUMMARY OF THE INVENTION

The present invention has been made in an effort to solve the above problems.

It is an object of the present invention to provide a shift control method which reduces shock generated as a result of a delay in the increase in engine rpm when converting from a lean-burn mode to a normal mode during tip-in.

To achieve the above object, the present invention provides a shift control method for an automatic transmission comprising the steps of converting to a lean-burn mode from a normal mode if a throttle voltage is less than a first predetermined value; determining if tip-in has occurred in the lean-burn mode using accelerator pedal signals; increasing throttle valve opening if it is determined that the throttle voltage has increased by a second predetermined value such that engine rpm is increased; determining if a difference between engine rpm and turbine rpm is greater than a predetermined number of rpm; and converting from the lean-burn mode to the normal mode if engine rpm is greater than turbine rpm by the predetermined number of rpm.

The shift control method may further comprise the step of retarding the converting operation from the lean-burn mode to the normal mode until the difference between the engine rpm and the turbine rpm becomes greater than the predetermined number of rpm after the throttle voltage has increased by the second predetermined value.

The shift control method may further comprise the step of controlling the throttle valve to be opened in response to a maximum stroke of the accelerator pedal after the step of converting from the lean-burn mode to the normal mode.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
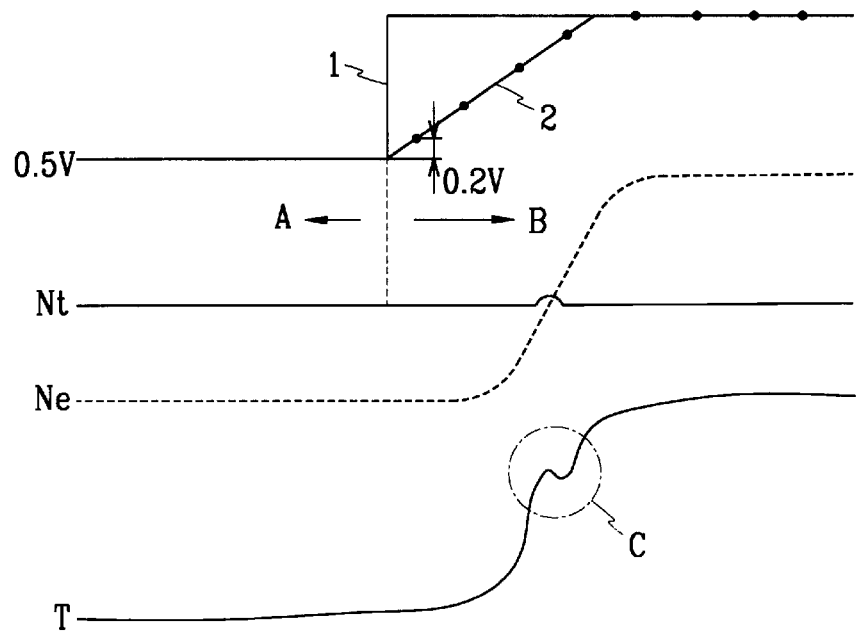
FIG. 1 is a graph of throttle valve opening, turbine rpm, engine rpm and torque for a vehicle using a conventional shift control method.
Figure 2:
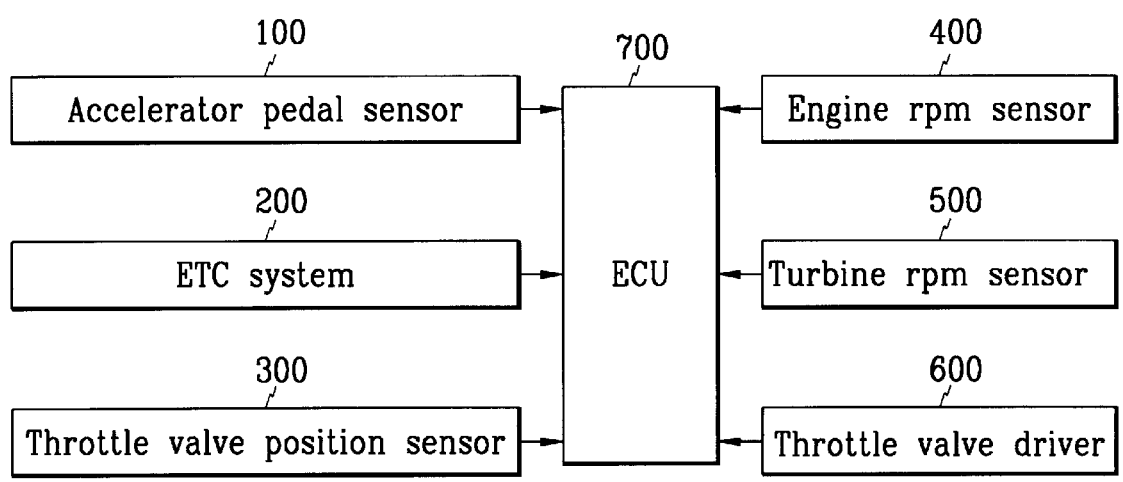
FIG. 2 is a block diagram of a shift control system for a transmission in a vehicle having an ETC system according to a preferred embodiment of the present invention.

FIG. 2 shows a block diagram of a shift control system for a transmission in a vehicle having an ETC system according to a preferred embodiment of the present invention.

The shift control system includes an accelerator pedal sensor 100 for detecting a change in position of an accelerator pedal and outputting corresponding signals; an ETC system 200 for receiving the signals output by the accelerator pedal sensor 100 and outputting corresponding throttle valve control signals; a throttle valve position sensor 300 for detecting an opening degree of a throttle valve (i.e., throttle valve opening) and outputting corresponding signals; an engine rpm sensor 400 for detecting engine rpm Ne and outputting corresponding signals; a turbine rpm sensor 500 for detecting turbine rpm Nt and outputting corresponding signals; a throttle valve driver 600 for varying throttle valve opening according to the throttle valve control signals output by the ETC system 200; and an ECU 700 for receiving the signals output by the throttle valve position sensor 300, engine rpm sensor 400 and turbine rpm sensor 500, and performing control to prevent the occurrence of shock. In particular, the ECU 700 performs control such that the vehicle is driven in a lean mode if a throttle voltage is, for example, 0.5V or less, and if the throttle voltage is, for example, 0.7V or more, performs control to maintain the lean mode until a point where engine rpm Ne are greater than turbine rpm Nt by, for example, 100 rpm and outputting a control signal to the ETC system 200 to delay the change in mode. After the mode is changed, the ECU 700 again outputs a control signal to the ETC system 200 such that the throttle valve opening corresponds to the driver-manipulated position of the accelerator pedal.

Figure 3:
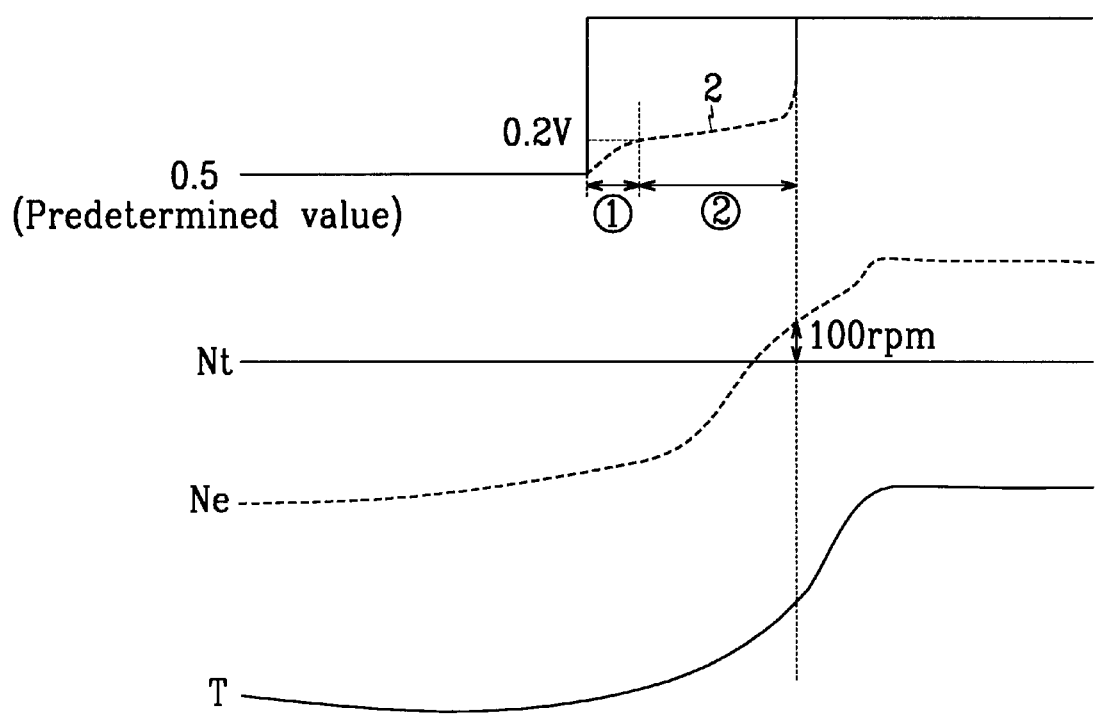
FIG. 3 is a graph of throttle valve opening, turbine rpm, engine rpm and torque for a vehicle using a shift control method according to a preferred embodiment of the present invention.
Figure 4:
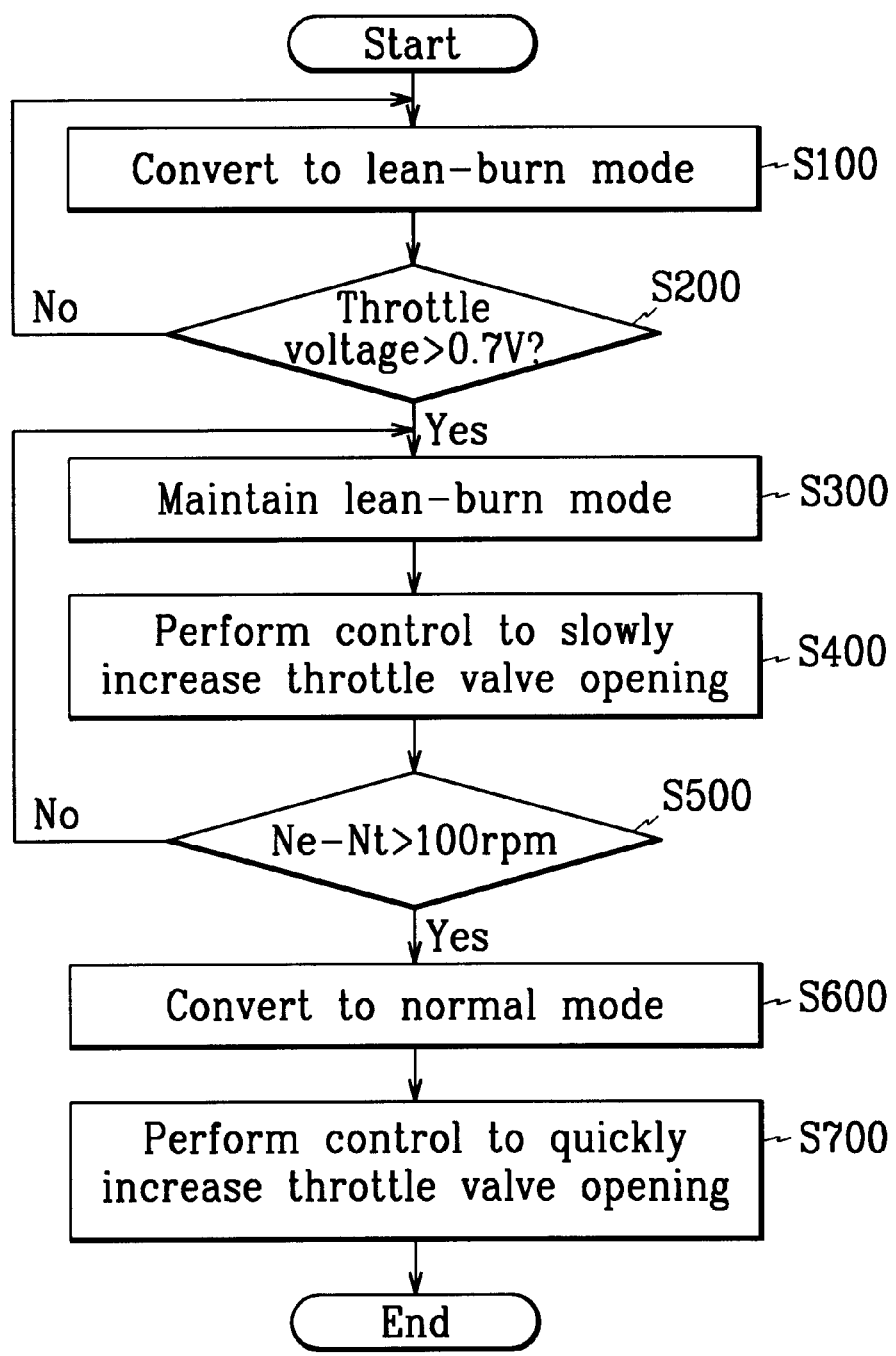
FIG. 4 is a flow chart of a shift control method according to a preferred embodiment of the present invention.

FIG. 3 is a graph of throttle valve opening, turbine rpm, engine rpm and torque for a vehicle using a shift control method according to a preferred embodiment of the present invention. With reference to the drawing, if the driver performs a lift-foot-up operation, the throttle valve is closed such that the throttle voltage becomes roughly 0.5V or less, with this value varying depending on the particular design of the engine. As a result, the ECU 700 performs control to convert form a normal mode to a lean-burn mode in step S100.

In the lean-burn mode, if the driver again depresses the accelerator pedal, the accelerator pedal sensor 100 detects this change in position of the accelerator pedal and outputs a corresponding signal to the ETC system 200. Accordingly, the ETC system 200 performs control so that the throttle valve is slowly opened. At this time, if the driver abruptly depresses the accelerator pedal, the throttle voltage rapidly increases as shown in interval 1 in FIG. 3. However, to prevent the continued rapid increase in the throttle voltage, the ETC system 200 performs control so that the throttle valve is slowly opened as shown in interval 2 in FIG. 3.

The opening of the throttle valve by control of the ETC system 200 is detected by the throttle valve position sensor 300 which outputs a corresponding throttle voltage to the ECU 700. The ECU 700 then determines if the throttle voltage output by the throttle valve position sensor 300 has increased by 0.2V or more above 0.5V of the lean-burn mode in step S200.

Since backlash shock is generated at this time if the mode is directly switched from the lean-burn mode to the normal mode, the ECU 700 first maintains a lean-burn mode even with an increase in throttle valve opening in step S300. Next, the ECU 700 outputs a control signal to the ETC system 200 starting from when the throttle voltage increases by 0.2V from 0.5V such that the throttle valve driver 600 is controlled to slowly increase throttle valve opening in step S400. That is, control is performed so that throttle voltage is increased linearly by a rate as shown in interval 2 of FIG. 3, thereby preventing a sharp increase in engine rpm Ne.

As shown in FIG. 3, engine rpm Ne are maintained at a predetermined level in the lean-burn mode until the driver again depresses the accelerator pedal such that the throttle voltage increases to 0.7V, at which point the throttle valve is slowly opened such that engine rpm Ne increase. Accordingly, engine rpm Ne are less than turbine rpm Nt until a point in interval 2. The ECU 700 continuously monitors engine rpm Ne and turbine rpm Nt to determine if engine rpm Ne have become greater than turbine rpm Nt by 100 rpm or more in step S500.

If engine rpm Ne become greater than turbine rpm Nt by 100 rpm, the ECU 700 performs control to again convert back to the normal mode in step S600. At the point where conversion is made to the normal mode from the lean-burn mode (i.e., at the end of interval 2 of FIG. 3), the ETC system 200, according to control signals output from the ECU 700, controls the throttle valve driver 600 such that the throttle valve opening is quickly increased in step S700. As a result, the torque T does not undergo backlash and instead smoothly increases, thereby preventing the occurrence of shock.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for an automatic transmission comprising the steps of:

converting to a lean-burn mode from a normal mode if a throttle voltage is less than a first predetermined value;

determining if tip-in has occurred in the lean-burn mode using accelerator pedal signals;

increasing the throttle valve opening if it is determined that the throttle voltage has increased by a second predetermined value such that the engine rpm is increased;

determining if a difference between engine rpm and turbine rpm is greater than a predetermined number of rpm; and converting from the lean-burn mode to the normal mode if the engine rpm is greater than turbine rpm by the predetermined number of rpm.

2. The shift control method of claim 2 wherein the first predetermined value is 0.7V, the second predetermined value is 0.2V and the predetermined number of rpm is 100 rpm.

3. The shift control method of claim 1 further comprising the step of retarding the converting operation from the lean-burn mode to the normal mode until the difference between the engine rpm and the turbine rpm becomes greater than the predetermined number of rpm after the throttle voltage has increased by the second predetermined value.

4. The shift control method of claim 1 further comprising the step of controlling the throttle valve to be opened in response to a maximum stroke of the accelerator pedal after the step of converting from the lean-burn mode to the normal mode.

* * * * *